(12) United States Patent
Perelli

(10) Patent No.: US 11,249,516 B2
(45) Date of Patent: Feb. 15, 2022

(54) MULTIPLE DISPLAY DEVICE WITH ROTATING DISPLAY

(71) Applicant: Lenovo (Singapore) Pte. Ltd., Singapore (SG)

(72) Inventor: Thomas Perelli, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 529 days.

(21) Appl. No.: 15/634,952

(22) Filed: Jun. 27, 2017

(65) Prior Publication Data

US 2018/0373292 A1    Dec. 27, 2018

(51) Int. Cl.
*G06F 1/16* (2006.01)

(52) U.S. Cl.
CPC ............ *G06F 1/1649* (2013.01); *G06F 1/165* (2013.01); *G06F 1/1616* (2013.01); *G06F 1/1656* (2013.01); *G06F 1/1681* (2013.01)

(58) Field of Classification Search
CPC ....................................................... G06F 1/16
See application file for complete search history.

(56) References Cited

U.S. PATENT DOCUMENTS

| | | |
|---|---|---|
| 2002/0039276 A1 | 4/2002 | Kaneko |
| 2003/0201915 A1 | 10/2003 | Anderson |
| 2004/0061997 A1 | 4/2004 | Skinner |
| 2004/0069117 A1 | 4/2004 | Akins |
| 2004/0264126 A1 | 12/2004 | Wells |
| 2006/0176277 A1 | 8/2006 | Daniel |
| 2010/0039764 A1 | 2/2010 | Locker |
| 2010/0142139 A1* | 6/2010 | Szabolcsi ............ G06F 1/1616 361/679.27 |
| 2012/0092253 A1 | 4/2012 | Irani |
| 2012/0327580 A1 | 12/2012 | Gengler |
| 2013/0027364 A1 | 1/2013 | Kim |
| 2013/0050090 A1 | 2/2013 | Stewart |
| 2013/0176674 A1* | 7/2013 | Brogan ................. G06F 1/1601 361/679.27 |
| 2014/0042293 A1* | 2/2014 | Mok .................... G06F 1/1652 248/682 |
| 2014/0310643 A1 | 10/2014 | Karmanenko |
| 2014/0375530 A1* | 12/2014 | Delaporte ............ G06F 1/1616 345/1.3 |
| 2015/0116362 A1 | 4/2015 | Aurongzeb |
| 2015/0277509 A1 | 10/2015 | Probst |
| 2015/0370339 A1 | 12/2015 | Ligtenberg |
| 2016/0091929 A1 | 3/2016 | Kwong |
| 2016/0259375 A1 | 9/2016 | Andre |
| 2017/0358275 A1 | 12/2017 | Klement |

OTHER PUBLICATIONS

United States Department of Labor, Computer Workstations eTool, accessed Jun. 15, 2017 (3 pages).
Tech E Blog, Feno: The Foldable Notebook Computer with a Pop-Out Mouse, May 3, 2011 (5 pages).

\* cited by examiner

*Primary Examiner* — Jerry Wu
(74) *Attorney, Agent, or Firm* — Brian J. Pangrle

(57) ABSTRACT

An apparatus can include a processor; memory accessible by the processor; a first housing that includes a first display operatively coupled to the processor; a second display operatively coupled to the processor and operatively coupled to a mechanism that rotates the second display with respect to the first display; a second housing that includes a keyboard; and a hinge assembly that operatively couples the first housing to the second housing.

17 Claims, 10 Drawing Sheets

MULTIPLE DISPLAY DEVICE WITH ROTATING DISPLAY

TECHNICAL FIELD

Subject matter disclosed herein generally relates to technology for computing or other devices.

BACKGROUND

A laptop, or notebook, computing device can have a display housing with a display and a keyboard housing with a keyboard where a hinge assembly couples the display housing and the keyboard housing.

SUMMARY

An apparatus can include a processor; memory accessible by the processor; a first housing that includes a first display operatively coupled to the processor; a second display operatively coupled to the processor and operatively coupled to a mechanism that rotates the second display with respect to the first display; a second housing that includes a keyboard; and a hinge assembly that operatively couples the first housing to the second housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
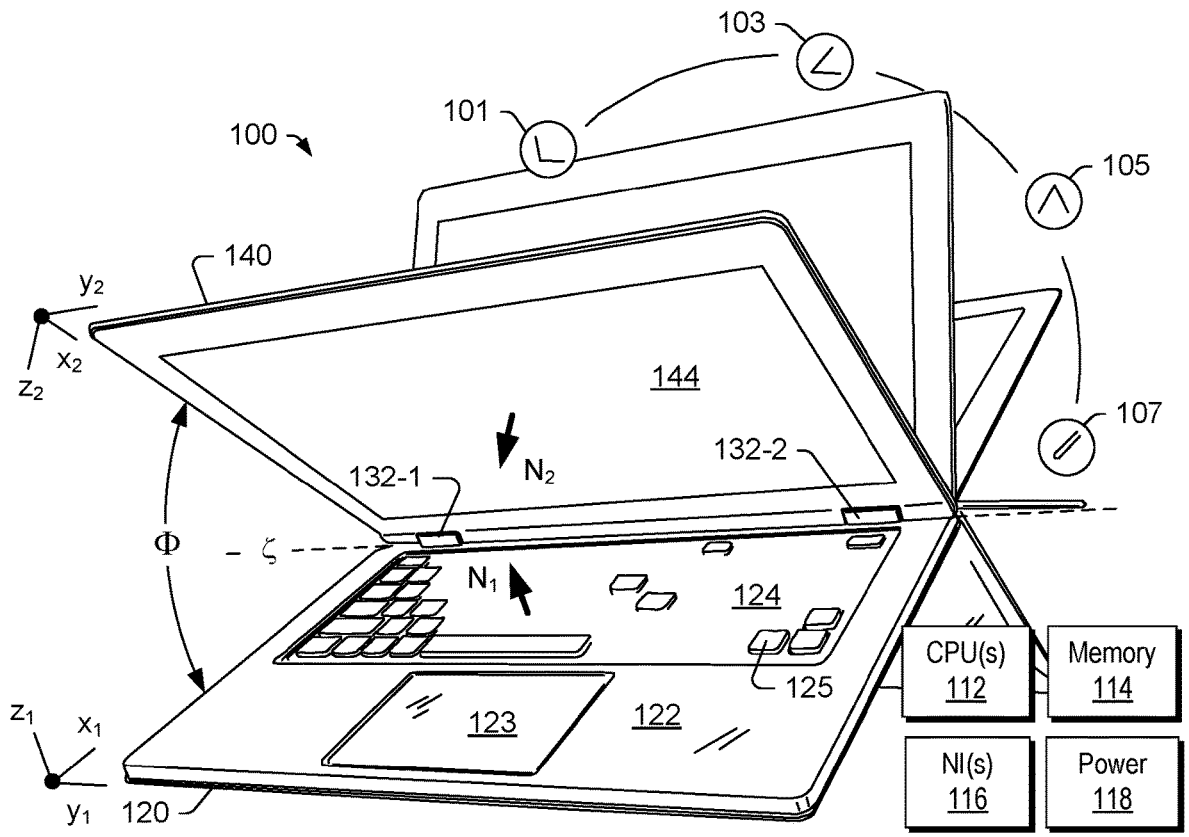
FIG. 1 is a diagram of an example of a device and example orientations of the device.
Figure 1:
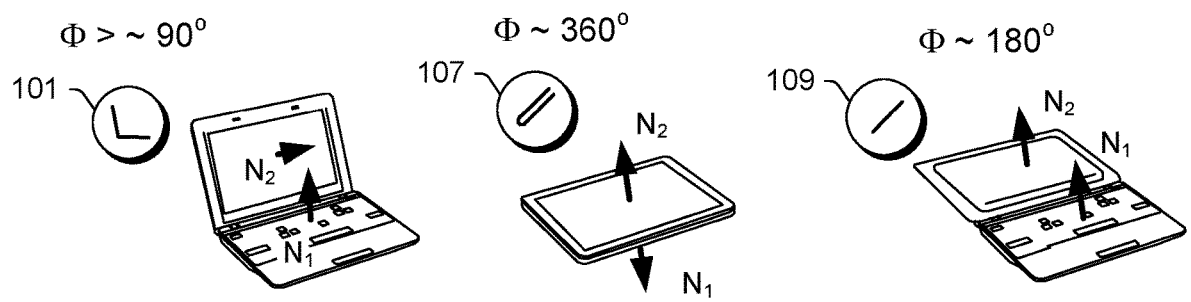

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display. In such an approach, a user may spin the keyboard housing by 180 degrees about a central axis of the single hinge (e.g., an axis orthogonal to the axis $\zeta$) and then rotate the keyboard housing such that the keys face the back side of the keyboard in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop, or notebook, computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

The device 100 of FIG. 1 can render various types of information to the display 144. Such information may be in the form of a graphical user interface (GUI) that is associated with an application. Where the device 100 is configured to execute various applications, each with one or more associated GUIs, a user may desire to toggle from one GUI of one application to another GUI of another application. For example, consider a user viewing a spreadsheet GUI of a spreadsheet application and then toggling to view an e-mail GUI of an email application, which may be prompted by an automated rendering of a notification GUI that an e-mail has been received (e.g., an incoming e-mail). In such an example, the display 144 may be utilized to a rather large extent (e.g., 70 percent or more) for the spreadsheet GUI such that there is insufficient display space for co-rendering of the spreadsheet GUI and the e-mail GUI. In the toggling example, the e-mail GUI may be rendered in an order that it obscures at least a portion of the spreadsheet GUI. Thus, when the user desires to return to the spreadsheet GUI, the user must toggle back to it or close the e-mail GUI. Such additional actions on behalf of the user can be inefficient and interrupt workflow, particularly as to a workflow involving information presented in the spreadsheet GUI.

As another example, a user may receive an alert via a smartphone such as a severe thunderstorm alert. In such an example, when the user is viewing the display 144 of the device 100 with a word processing application GUI rendered thereto, the user will have to toggle to or otherwise instantiate a weather application that can render a weather GUI (e.g., radar image or graphic) to the display if the user wishes to see the progression of the thunderstorm. And, after viewing and toggling back to the word processing application GUI, if the user wants to check back in a few minutes, the user will have to again toggle between the application GUIs.

The device 100 of FIG. 1 is shown as a laptop (e.g., laptop computer), which may be considered to be a mobile device, for example, a device being of a size and a weight suitable for transport (e.g., in a shoulder bag, a handbag, a briefcase, etc.). Such a device may be utilized when a person is out of her office, yet still engaged in work. When that user is in her office, she may have a docketing station for the device or a desktop/workstation computer operatively coupled to a large format display or displays, which can readily provide for rendering multiple GUIs simultaneously. In such an in-office scenario, given ample display space, toggling may be less frequent. However, as people may call on her office phone, stop-in, etc., a perceived need to be "connected" may be less than when mobile. Being mobile comes with its own tasks (e.g., getting from one place to another), and adds to a sense of being ready for multitasking (e.g., being connected while moving from one place to another).

A user may utilize a device that can execute a number of applications and that user may expect to be able to toggle through such applications to view multiple pieces of information. As explained, the display on a laptop can be insufficient as to size and resolution of information such as text to practically view GUIs from two different applications simultaneously. The U.S. Department of Labor Occupational Health and Safety Administrations provides guidance for viewing a display (e.g., a monitor), including use of a viewing distance that is between 20 inches and 40 inches (50 cm and 100 cm) from the eye to the front surface of the display; noting that "text size may need to be increased for smaller monitors". For a given GUI that includes text, a relationship often exists between the size of the GUI and the size of text. For example, if size of text is to be increased for legibility, the size of the GUI may be a limiting factor and/or the size of the GUI may be increased, which means that less display area exists for rendering of another GUI (e.g., of another application, etc.). As explained, a device can include a mini-display in addition to a main display where the mini-display can be utilized for rendering information (e.g., associated with one or more applications) and where the main display can be utilized for rendering other information (e.g., associated with one or more applications). In such an example, the mini-display may be utilized for rendering messages (e.g., email, text, etc.) and/or other time-dependent information that is received via one or more network interfaces of the device; while the main display may be utilized to render information such as that of a word processing application, a spreadsheet application, a presentation application, a web browser application, etc. In various scenarios, a mini-display can reduce a user's toggling for going back and forth between applications which can be annoying (e.g., not a very a fluid process).

Where a mini-display is rotatable such that information is viewable when a device such as the device 100 is in a closed state, the mini-display can be available for rendering of information such that a user does not have to transition the device 100 to an open state or, for example, where the device 100 can be in communication with a phone, the mini-display can be available for rendering of information such that a user does not have to physically grab the phone. For example, when commuting, a user may be walking on a city street to get to a bus stop and hear and/or feel a phone alert (e.g., as to a message, a phone call, etc.). In such an example, rather than having to reach for the phone to check the alert, information associated with the alert may be rendered to the mini-display while the device 100 is in a closed state. Where the user is carrying the device 100 in her hand, the user may glance down at the mini-display for viewing rendered information associated with the alert (e.g., a text message, a phone number, a speech-to-text ticker, etc.). In such an example, the user can avoid juggling multiple devices (e.g., the device 100 and a phone) in response to receipt of an alert by the phone.

As mentioned, a device such as a laptop (e.g., a laptop computer or laptop information handling device) can include a main display and an integrated smaller display where the integration of the smaller display does not impact size or form factor of the device nor transitioning from one orientation to another with respect to the main display of a display housing and a keyboard of a keyboard housing (see, e.g., the various orientations in FIG. 1). The smaller display, which may be referred to as a mini-display and/or a rule display, can be of a size that is sufficient to render information such as text that is readily viewable at a distance of about 20 inches (e.g., about 50 cm). Such a mini-display may be sized and configured to render a single line of text or may be sized and configured to render multiple lines of text. For example, a mini-display may be sized to render one or more lines of text of an email and/or a landscape view of a weather radar image or graphic.

As an example, a mini-display of a device can be utilized to render messages received by a phone, a pager, etc. that is in communication with the device via one or more communication interfaces (e.g., BLUETOOTH communication interface, etc.). As an example, a mini-display of a device can be utilized to render information from a note application (e.g., a reminder application). In such an example, a user may enter information that may be the type of information one would write on a sticky note. Such an application may render one or more notes, optionally in a rolodex or other type of manner (e.g., scroll vertical, scroll horizontal, etc.) where a user can scroll through the notes using touch input, key input, voice input, etc. In such an example, the mini-display can take the place of a bezel of a monitor, which some users utilized for placing sticky notes.

As explained, a device can include a mini-display that allows a user to readily view, emails, text, notes, radar, video, pictures, SKYPE information, LYNC information, etc., optionally without interrupting a view of a main display of the device. A mini-display can provide quick access to information without interruption of rendering of information to a main display.

As mentioned, a mini-display can be rotatable. For example, upon transitioning a device such as the device 100 from a closed orientation to an open orientation, a mini-display may rotate, via an automated mechanism. As an example, a mini-display may be manually rotatable and/or automatically rotatable.

As an example, a mini-display of a device can be automatically rotated to a viewing angle where the mini-display is viewable from outside of the device when the device is transitioned from an open orientation to a closed orientation. In such an example, transitioning the device from a closed orientation to an open orientation can cause the mini-display to automatically rotate to a viewing angle where the mini-display is viewable from a display side of the device (e.g., a display side of a main display of a display housing).

As an example, a laptop computer, as a type of device, can include a mini-display as a secondary display. As an example, a device can include a mini-display that is operatively coupled to circuitry of the device (e.g., one or more processors, one or more microcontrollers, etc.). In such an example, the device can render information to the mini-display, for example, optionally in a manner independent of rendering of information to a main display of the device. As an example, a mini-display may be a touchscreen display that includes one or more types of touch sensitive circuitry (e.g., capacitive touch, infrared sensor touch sensing, etc.). As an example, a device can include, optionally as part of a mini-display, wireless communication circuitry that can be operatively coupled to wireless communication circuitry of another device and/or network service such as, for example, a mobile phone, a global positioning system device, a wireless access point device, a router, a camera (e.g., still and/or video), a streaming audio information device (e.g., a home audio system, etc.), a weather service, a stock market information service, an emergency alert service, a home security service, etc. In such examples, the mini-display can render information associated with one or more other devices and/or information received via a network or networks in a manner that does not alter information being rendered to a main display of the device.

As an example, a mini-display may include panels where each panel can be assigned to a device and/or a service. For example, one panel may be assigned to a smartphone, another panel may be assigned to a weather service and yet another panel may be assigned to a text messaging account.

As an example, a device with a main display and a mini-display can allow a user to perform various tasks (e.g., workflow or workflows) using the main display while information may be rendered to the mini-display where such information may or may not be related to one or more of the various tasks. For example, where the device is operatively coupled to a user's smartphone, the mini-display may render call information, email information, text messaging information (e.g., instant messenger, etc.), etc. to the mini-display as associated with one or more accounts of the user's smartphone, which may differ from one or more accounts of the user's device (e.g., a laptop computer). Where the user's device is a work device, the smartphone and the device may be kept independent as to accounts (e.g., a work email and a personal email) while the user can still view information received via such accounts while performing various tasks (e.g., viewing work email on the main display and viewing personal email on the mini-display).

As an example, a mini-display may be designed for rendering a single line of information. For example, a mini-display may be a single text line display. As an example, a mini-display may be designed for rendering multiple lines of information and/or graphics.

As an example, a mini-display may be a rule display. As an example, a mini-display may be a notification display.

As an example, a mini-display may be linked via wireless circuitry and appropriate wireless communication protocol(s) to another device such as a cell phone. Such a mini-display can provide a quick and easy access to notifications, such as emails, text, weather alerts, etc. from both inside the laptop and outside when it is closed where, for example, the mini-display rotates about an axis while transitioning between states (e.g., closed and open states). In such an example, frequent, everyday information may be rendered to the mini-display to avoid having such information taking space on a main display. As an example, a replication mode may be implemented where information rendered to the mini-display is replicated to the main display, for example, to provide for rendering of more lines of text, etc. As an example, a switch mode may be implemented where an application may be called up and rendered to the main display where one or more of a notification, tool(s), menu(s), button(s), etc., for that application has been rendered to the mini-display. For example, where an email notification is rendered to the mini-display, a touch of the mini-display may cause an email application to be instantiated or otherwise opened and rendered to the main display such that a user can readily read and/or respond to the corresponding email.

As an example, where an application executing in an operating system environment of a device calls for rendering of a menu or toolbar to the main display, a user may drag and drop the menu or toolbar to a mini-display or, for example, set a preference to render the menu or toolbar to the mini-display. In such an example, where a user is concerned with information rendered to the main display, the menu or toolbar does not need to take space on that main display. For example, consider a photo editing application where a photo may be rendered to the main display and one or more menu items, one or more tools, etc. may be selected from the mini-display. As to a drag and drop action, a user may utilize a mouse or other pointing device (e.g., optionally a finger) and select a menu or toolbar and move it downward to an edge of the main display such that the device is triggered to re-render the menu or toolbar to the mini-display. As another example, a mini-display icon may be rendered to the main display where a menu or toolbar or other information may be dragged and dropped onto the mini-display icon to trigger a device to re-render that menu, toolbar, etc., to the mini-display. As yet another example, a user may right click on a graphic, etc. (e.g., a menu, toolbar, etc.) rendered to a main display and an option may appear in a pop-out menu to re-render that graphic, etc. to the mini-display.

As an example, a laptop computer can include a main display and a mini-display that functions to render information from another device akin to a heads-up display for that other device such that a user need not have to reach and actuate the other device (e.g., consider a smartphone, etc.).

As an example, a multi-display device can include a rotatable mini-display that can allow a user to access various types of information when the device is closed (e.g., in a clamshell orientation), which may be referred to as a closed state. As an example, a person could have her hands full and get a text from her doctor saying that her appointment has been canceled. In such an example, the information is right in front of the person without having to get out her smartphone (e.g., from a pocket, a purse, a belt clip, etc.). In such an example, the smartphone may be utilized for one or more other tasks, for example, consider rendering audio to one or more earbuds in the person's ear or ears. In such an example, the person may continue to enjoy listening to the audio without having to access the smartphone (e.g., consider listening to music via the smartphone on a busy street corner and being able to view a notification generated by the smartphone and rendered to the mini-display).

As mentioned, a mini-display can be rotatable, which may occur automatically and/or manually. For example, a mechanism may provide for biasing a mini-display upon transitioning a device from a closed clamshell mode to an open clamshell mode to orient the mini-display at an angle that may be measured as an angle from a plane of a keyboard housing of the device.

As an example, a mini-display may access information from a laptop computer (e.g., via an interface of the mini-display being operatively coupled to an interface of the laptop computer), for example, one or more purposes (e.g., emails, electronic sticky notes, FaceTime video, etc.). As an example, a mini-display may be wired to circuitry of a main display housing and/or circuitry of a keyboard housing. As an example, a mini-display can include a power interface and a communication interface such that the mini-display is supplied with power (e.g., via one or more batteries of a laptop computer) and such that the mini-display (e.g., as a mini-display unit) is supplied with information via an appropriate interface where circuitry of the mini-display can then render graphics (e.g., text, graphics, etc.) to the mini-display. As an example, a graphics process may be part of the mini-display and/or part of a keyboard housing and/or part of a display housing. For example, a laptop computer can include a graphics card that can receive information and render information to one or more displays. As an example, a laptop computer may include a plurality of graphics cards where each display may have a dedicated graphics card (e.g., dedicated graphics circuitry). As an example, a laptop computer may include a graphics card that can support multiple displays where one of the multiple displays is a mini-display; noting that where a device includes multiple mini-displays, such a graphics card may support multiple mini-displays.

As an example, a multiple display device can include a mini-display that provides a user with "life support" information in a "heads-up" manner without the user having to toggle between screens to get his other applications and/or handle another device. As an example, a mini-display may be disposed within a display housing that includes a main display where the mini-display is rotatable about a rotational axis. In such an example, the display housing can include a cut-out portion with one or more axles and/or journals where the mini-display can be rotatably mounted using such one or more features (e.g., via one or more journals and/or axles of the mini-display). As an example, the mini-display may be biased via a spring such as a torsion spring. In such an example, upon transitioning the display housing with respect to a keyboard housing, the mini-display may rotate, for example, from an outwardly facing orientation to an inwardly facing orientation (e.g., inwardly between a display of the display housing and a keyboard of the keyboard housing).

As an example, a mini-display may be of a selected size such as greater than about 20 percent of the width of a display housing. As an example, a mini-display may be about 70 percent or more of the width of a display housing.

As an example, a mini-display may optionally include a locking mechanism that can lock the mini-display in an orientation, which may be outwardly facing or inwardly facing. For example, where a user desires to forego transitioning of the mini-display, a mechanism may be disabled via locking of the mini-display in a selected orientation with respect to a display housing, which may be outwardly facing (e.g., visible from a back side of a display housing) or inwardly facing (e.g., visible from a front side of a display housing, which is a main display side).

Various devices can include multiple displays (e.g., as a multi-display device or a multiple display device). Various display arrangements of a device with multiple displays can allow for easy viewing access (e.g., of texts, phone information, urgent messages, emails, etc.) when the device is in one or more orientations, which can include, for example, a folded closed orientation when a user is in sight of the device (e.g., carrying the device or in the same room as the device).

As an example, a device can include a mini-display, which may be suitable for rendering of a single line of alphanumeric text or multiple lines of text or, optionally, configured to render graphics (e.g., via a graphics processor, etc.). As an example, graphics may be graphics renderable via, for example, Open Graphics Library (OpenGL) technology, which is a cross-language, cross-platform application programming interface (API) for rendering 2D and 3D vector graphics. Such an API may be used to interact with a graphics processing unit (GPU), for example, to achieve hardware-accelerated rendering. As an example, a multiple display device can optionally include one or more graphics processors that can implement vector graphics.

Figure 2:
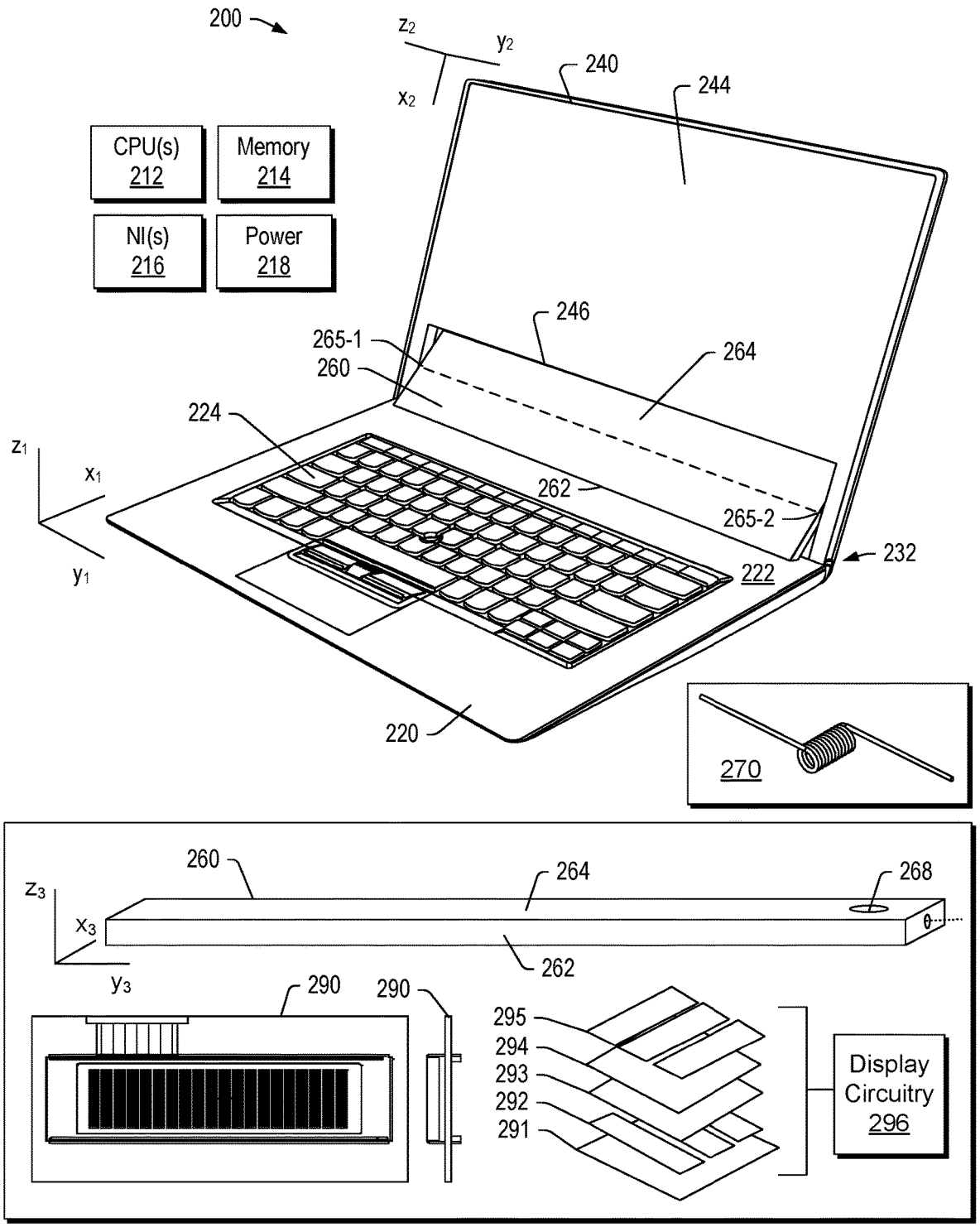
FIG. 2 is a diagram of an example of a device in an example orientation, an example of a biasing element, and an example of a display with an example of display circuitry.

FIG. 2 shows an example of a device 200 that includes a processor 212 or processors, memory 214 accessible by the processor 212; a display housing 240 that includes a display 244 operatively coupled to the processor 212 and a recess 246 for a mini-display unit 260 that includes a mini-display 264; and a keyboard housing 220 that includes a keyboard 224.

As shown in the example of FIG. 2, the mini-display unit 260 can be operatively coupled to the display housing 240 via one or more axles 265-1 and 265-2 that allow for rotation of the mini-display unit 260 with respect to the display housing 240. For example, the mini-display unit 260 is shown as including an edge 262 that, upon rotation of the mini-display unit 260, can contact a surface 222 of the keyboard housing 220.

In the example of FIG. 2, the edge 262 can extend for a length that may be approximately the length of the mini-display unit 260 or a lesser length where a length may be determined by a force equation such that the maximum amount of force that is applied per unit area (e.g., pressure) is below a certain value. In such an approach, wear caused by the mini-display unit 260 contacting the contact surface 222 of the keyboard housing 220 may be reduced. As an example, the contact surface 222 and/or the edge 262 may be selected from one or more types of material to reduce wear. For example, the contact surface 222 may be enhanced (e.g., a metallic strip) and/or made for a more durable material than the upper surface of the keyboard housing 220. As an example, the edge 262 may be part of a housing of the mini-display unit 260 and made of that housing material or the edge 262 may be an element (or elements) that are attached to a housing of the mini-display unit 260. As an example, the edge 262 and/or the surface 222 may be selected with appropriate friction coefficients and hardnesses and/or elastomeric properties. As an example, one or more of the edge 262 and the surface 222 may be or include polytetrafluoroethylene (PTFE) (a synthetic fluoropolymer of tetrafluoroethylene). Such a material can provide for durability and a low friction coefficient. As an example, the edge 262 may be a PTFE material and/or be coated with a PTFE material. As an example, the surface 222 may be a PTFE material and/or be coated with a PTFE material. As explained with respect to FIG. 3, the edge 262 can contact and move along the surface 222 when a transition occurs for the display housing 240 with respect to the keyboard housing 220.

Figure 4:
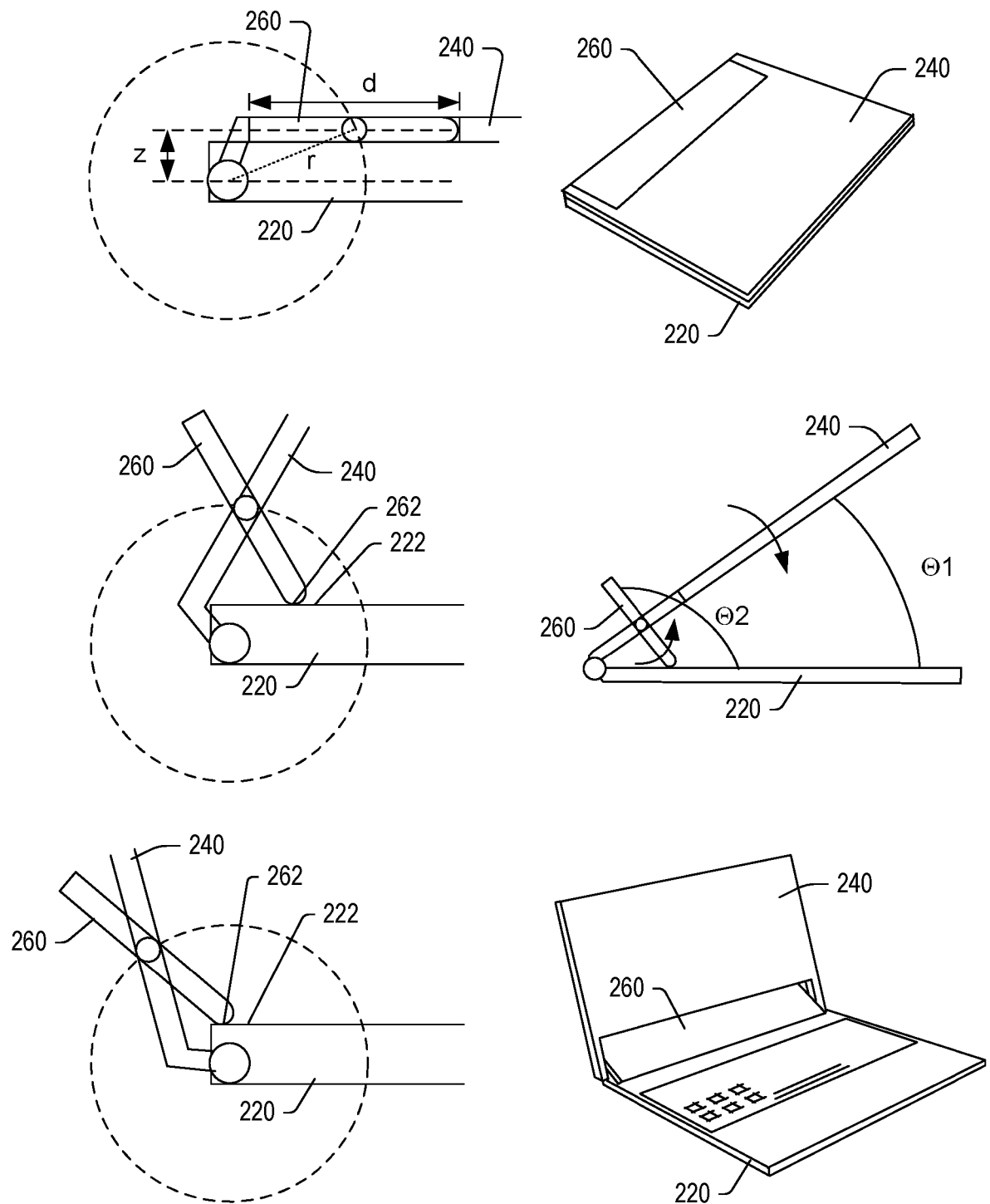
FIG. 4 is a series of views of the example device of FIG. 2 in various orientations.

As an example, the edge 262 may be shaped with respect to its profile. For example, consider one or more of a beveled shape (e.g., a chamfer), a radiused shape (e.g., a rounded portion), etc. Such a shape may provide for ease of movement of the edge 262 with respect to the surface 222. For example, the edge 262 can include an angled flat portion and radiused portions to alleviate sharp corners. As an example, the edge 262 may be substantially semi-circular in its cross-sectional profile such that no corners are encountered by the surface 222 during a transition that moves the edge 262 along the surface 222. FIG. 4 shows an example of the edge 262 being curved, where such a curved shape may be a semi-circular, elliptical, or other curved shape that can facilitate transitions (e.g., with reduce risk of sticking, etc.).

As an example, the mini-display unit 260 can be biased (e.g., directly and/or indirectly) via one or more biasing elements. FIG. 2 shows an example of a biasing element, particularly a torsion spring 270 that may be utilized to bias the mini-display unit 260. As an example, such a spring may be part of a rotation mechanism that cooperates with one or both of the one or more axles 265-1 and 265-2. Such a spring may bias the mini-display unit 260 in a manner that causes the edge 262 to apply force to the surface 222 of the keyboard housing 220. In the example of FIG. 2, one end or leg of the torsion spring 270 may be fixed with respect to the display housing 240 and another end or leg of the torsion spring 270 may be fixed with respect to the mini-display unit 260. In such an example, the torsion spring 270 can be a coil spring where the coil portion is disposed about an axle and where a biasing force applied by the torsion spring 270 can cause the mini-display unit 260 to rotate clockwise or counter-clockwise when the display housing 240 rotates counter-clockwise or clockwise, respectively.

A torsion spring can be structured to obey an angular form of Hooke's law:

$$\tau = -\kappa\theta$$

where $\tau$ is the torque exerted by the spring in newton-meters, $\theta$ is the angle of twist from its equilibrium position in radians and where $\kappa$ is a constant with units of newton-meters per radian, variously called the spring's torsion coefficient, torsion elastic modulus, rate, or just spring constant, equal to the change in torque required to twist the spring through an angle of 1 radian. The negative sign indicates that the direction of the torque is opposite to the direction of twist.

The energy U, in joules, stored in a torsion spring can be approximated by the following equation: $U=0.5 \kappa \theta^2$. As an example, a biasing element may be included in the device 200 that can increase its stored energy (e.g., potential energy) when the device 200 is in a closed orientation (e.g., consider winding of a spring) and release some of that energy when transitioning the device 200 to an open orientation (e.g., consider unwinding of a spring). In such an example, the biasing element can still include sufficient energy to bias a portion of a mini-display unit such that it maintains a relatively stable position with respect to a keyboard housing and/or a display housing.

As shown in the example of FIG. 2, the device 200 includes one or more hinges 232 that operatively couple the display housing 240 and the keyboard housing 220. As an example, the mini-display unit 260 may change its orientation responsive to a transition of the device from a closed orientation to an open orientation. For example, the device 200 is shown as a clamshell device that can include a closed, clamshell orientation where the display 244 faces keys of the keyboard 224 of the keyboard housing 220. In the closed orientation, the display 264 can be rotated from the orientation shown in FIG. 2 such that the display 264 is facing away from the surface 222 of the keyboard housing 220. Various Cartesian coordinate systems are shown in FIG. 2, which may be utilized to describe one or more features of a device, a housing, a display (e.g., a main display, a mini-display, etc.), a recess, etc. As an example, a Cartesian coordinate system may be a right-handed or a left-handed coordinate system.

FIG. 2 shows an example of the mini-display unit 260 as including an ambient light sensor 268, which may be utilized to sense ambient light and optionally adjust brightness of the mini-display unit 260 (e.g., light emitting circuitry of the mini-display).

FIG. 2 shows an example of the mini-display 260 as including an Organic Light Emitting Diode (OLED) assembly 290 that includes OLED display components such as, for example, a substrate 291, an anode 292, a conductive layer (e.g., organic molecules or polymers) 293, an emissive layer (e.g., organic molecules or polymers) 294 and a cathode 295. As shown, the mini-display unit 260 includes display circuitry 296, which may be operatively coupled to one or more of the OLED display components. In the example of FIG. 2, the OLED assembly 290 includes a character height of four characters (e.g., 4 lines) with a number of characters per line. While 20 characters per line are shown in the example of FIG. 2, a mini-display may include from about 8 characters to about 500 characters per line. As mentioned, a mini-display may be a graphics display, which can render characters (e.g., text characters) and other graphics. As an example, a mini-display may include multiple display assemblies, which may optionally be arranged as panels (e.g., in a panel vector arrangement and/or a panel matrix arrangement).

As an example, a mini-display may be about 2 cm to about 20 cm or more in a widthwise dimension (e.g., y-direction) and may be about a few millimeters to about a few centimeters in a depthwise dimension (e.g., x-direction) and may be about a few millimeters to a centimeter or more in a thickness dimension (e.g., z-direction).

As an example, an OLED display can be made up of a layer of organic material placed between two conductors. In such an example, the two conductors (an anode and a cathode) can be between a glass top plate (seal) and a glass bottom plate (substrate). When an electric current is applied to the two conductors, the organic material produces a bright, electro-luminescent light. When energy passes from the negatively charged layer (cathode) to the other (anode) layer, it stimulates the organic material between the two, which in turns emits lights that is visible through the outermost layer of glass.

To produce color, an electric current can be applied to stimulate relevant pixels on the OLED display. Pixels can be created by an arrangement of the cathodes and anodes; which can be arranged perpendicular to each other. The electric current applied to the selected strips of anodes and cathodes determine which pixels get turned on and which pixels remain off and brightness of each pixel can be proportional to the amount of applied current.

A color OLED can include a metal cathode with a negative charge, an electron transport layer, organic material, a hole transport layer, and an anode with a positive charge. Each pixel of a color OLED may be divided into red, green, and blue sub-pixels. When a controller (e.g., display circuitry) applies an electric current to a particular pixel, the current passes through the organic material causing the material to emit light. By adjusting the intensity of the electric current in each red, green, and blue sub-pixel, specific colors and gradients can be created.

As an example, a mini-display may be a character display and/or a graphic (or graphics) display. A mini-display may be relatively thin (e.g., a few millimeters to about 1 cm) can be self-illuminated, variable brightness (e.g., consider multi-step brightness) can include one or more of a serial and/or parallel microprocessor (MPU) interface, can include one or more of SPI, I²C, parallel, etc., interfaces, etc. As an example, circuitry of a display may include a font table.

Figure 3:
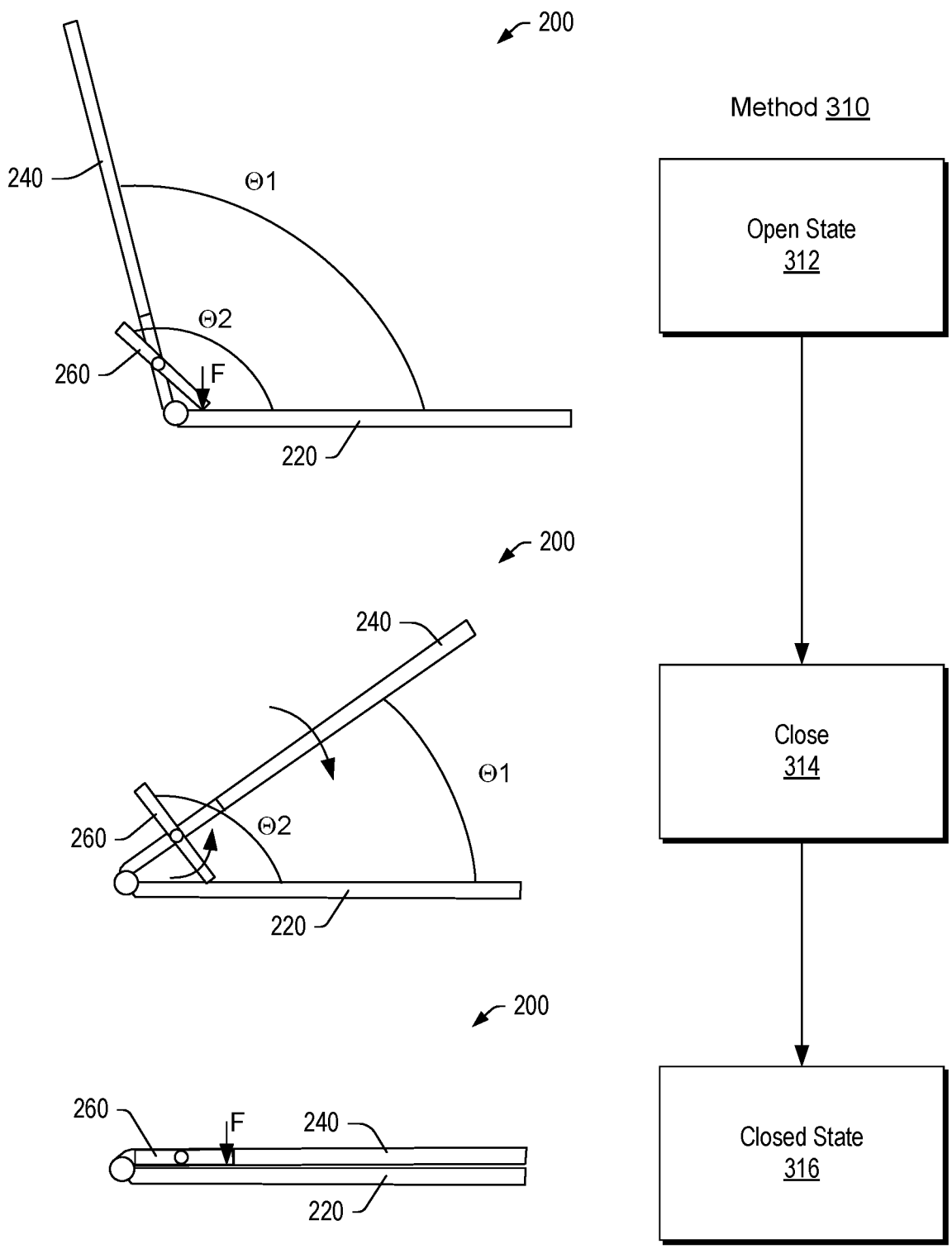
FIG. 3 is a diagram of an example of a method that is illustrated with respect to various orientations of the example device of FIG. 2.

FIG. 3 shows an example of a method 310 along with a side view of the device 200 of FIG. 2 in various orientations. The method 310 includes an open state block 312 where the device 200 is in an open state where the display housing 240 can be defined by an angle Θ1 and where the mini-display unit 260 can be defined by an angle Θ2, which can be referenced with respect to the keyboard housing 220, which is shown to be horizontal (e.g., as if on a table, a desk, etc.). Also shown is a direction of force via an arrow labeled "F" where the edge 262 of the mini-display unit 260 can apply force to the surface 222 of the keyboard housing 220 via a biasing mechanism, which may include a torsion spring or torsion springs. In the views of FIG. 3, the direction of force is applied in a clockwise direction.

As shown, the method 310 includes a close block 314 where the display housing 240 is being transitioned in a manner that diminishes the angle Θ1 of the display housing 240 with respect to the keyboard housing 220. As shown, during closing, the axis of the mini-display unit 260 moves closer to the keyboard housing 220, which, in turn, causes the mini-display unit 260 to be rotated counter-clockwise. In such an example, where a torsion spring is utilized, the torsion spring can be tightened (e.g., further energized) as force is applied to bring the display housing 240 closer to the keyboard housing 220. As shown, the counter-clockwise rotation of the mini-display unit 260 causes the angle Θ2 to increase while the angle Θ1 of the display housing 240 decreases.

As shown, the method 310 further includes a closed state block 316 where the display housing 240 is substantially parallel to the keyboard housing 220. In such a state, the mini-display unit 260 can still be applying force to the surface 222 of the keyboard housing 220; however, such force is insufficient to overcome the frictional force of the hinge or hinges that operatively coupled the display housing 240 and the keyboard housing 220. Accordingly, the device 200 can remain in the closed state.

n the closed state, the mini-display unit 260 is substantially co-planar with the display housing 240 and substantially parallel to the keyboard housing 220. In the example closed state, the angles Θ1 and Θ2 can be approximately 0 degrees.

As shown in FIG. 3, the display housing 240, the mini-display unit 260 and the keyboard housing 220 can be substantially shaped as rectangular plates of a particular thickness. While the views in FIG. 3 show relative thicknesses, the thicknesses can differ. For example, a display housing can be thinner than a keyboard housing or vice versa. As an example, a mini-display unit can be approximately the same thickness as a display housing, thicker than a display housing or may be thinner than a display housing. For example, a mini-display unit can be of a thickness that is in a range from approximately 20 percent to approximately 150 percent of the thickness of a display housing that includes a recess that can accommodate at least a portion of the mini-display unit.

FIG. 4 shows examples of various dimensions of a device such as the device 200 of FIG. 2, which includes the keyboard housing 220, the display housing 240 and the mini-display unit 260. As mentioned, in the example of FIG. 4, the edge 262 of the mini-display unit 260 includes a curved profile.

In FIG. 4, a circle represents some positions that the axis of rotation of the mini-display unit 260 may achieve as defined about an axis of rotation of the display housing 240 with respect to the keyboard housing 220. The circle can be defined by a radius "r", which is a distance between the two axes. Further, in the z-direction, a dimension "z" is shown that represents a displacement between the axes in the closed state. Yet further, a dimension "d" represents a depth (e.g., along an x-direction) of the mini-display unit 260, which as mentioned, is a fraction of a depth of a display housing such as the display housing 240.

During transitions, the axis of rotation of the mini-display unit 260 moves away from the surface 222 of the keyboard housing 220. In response, the position of the edge 262 of the mini-display unit 260 moves closer to the axis of rotation of the display housing 240 with respect to the keyboard housing 220. Further, the angle of the mini-display unit 260 changes as it rotates.

Figure 5:
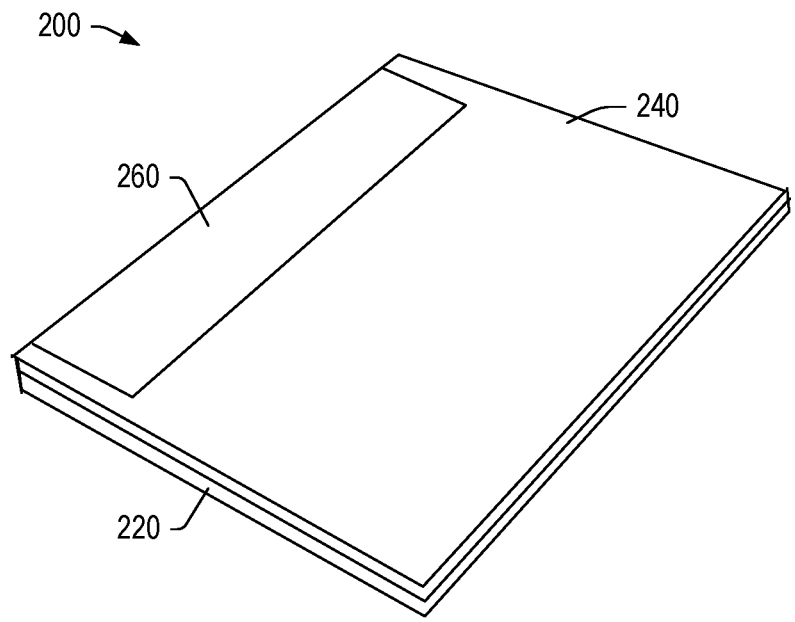
FIG. 5 is a series of views of the example device of FIG. 2 in various orientations.
Figure 5:
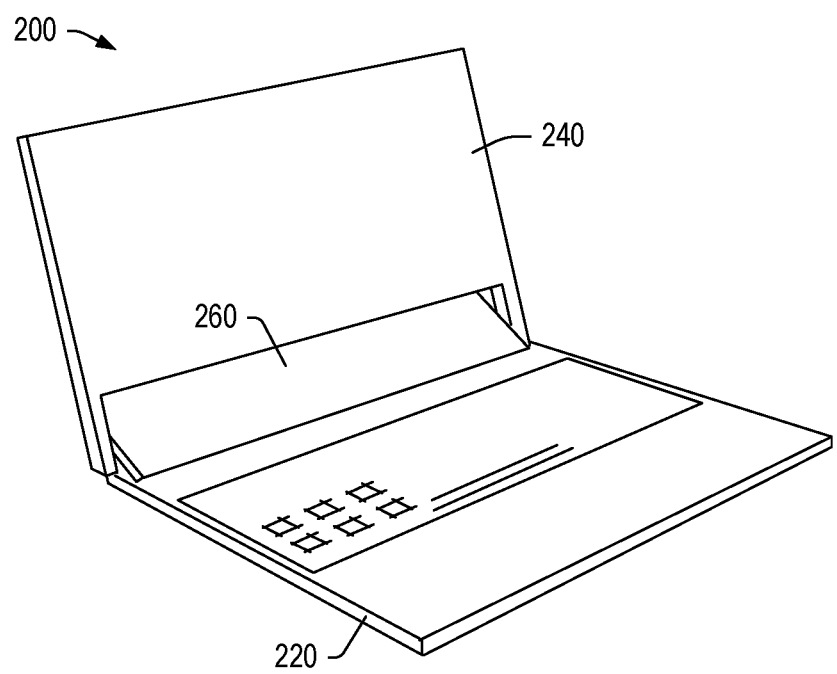

FIG. 5 shows the device 200 of FIG. 2 in a closed state (top) and in an open state (bottom). The device 200 can be transitioned between these two states where the mini-display unit 260 can transition between an outwardly facing display state (top) and an inwardly facing display state (bottom). A user may view information rendered via the mini-display unit 260 when the mini-display unit 260 is in either of the two states shown.

As an example, a device can be an apparatus that includes a processor; memory accessible by the processor; a first housing that includes a first display operatively coupled to the processor; a second display operatively coupled to the processor and operatively coupled to a mechanism that rotates the second display with respect to the first display; a second housing that includes a keyboard; and a hinge assembly that operatively couples the first housing to the second housing. For example, the device 200 can include a processor; memory accessibly by the processor; the display housing 240 that includes the display 244 as a first display; the mini-display 264 of the mini-display unit 260 as a second display where the mini-display 264 may be operatively coupled to the processor and operatively coupled to a mechanism that rotates the mini-display 264 with respect to the display 244; the keyboard housing 220 that can include a keyboard; and a hinge assembly, which may be a hinge assembly such as a hinge assembly 909 as in FIG. 9, or another type of hinge assembly. In such an example, the mechanism can cause rotation of the mini-display unit 260 and hence the mini-display 264. As shown in the example of FIG. 5, the mini-display 264 may rotate from an outwardly facing orientation when the display housing 240 and the keyboard housing 220 are in a closed orientation (see, e.g., the upper orientation of FIG. 5) to an inwardly facing orientation when the display housing 240 and the keyboard housing 220 are in an open orientation (see, e.g., the lower orientation of FIG. 5).

Figure 6:
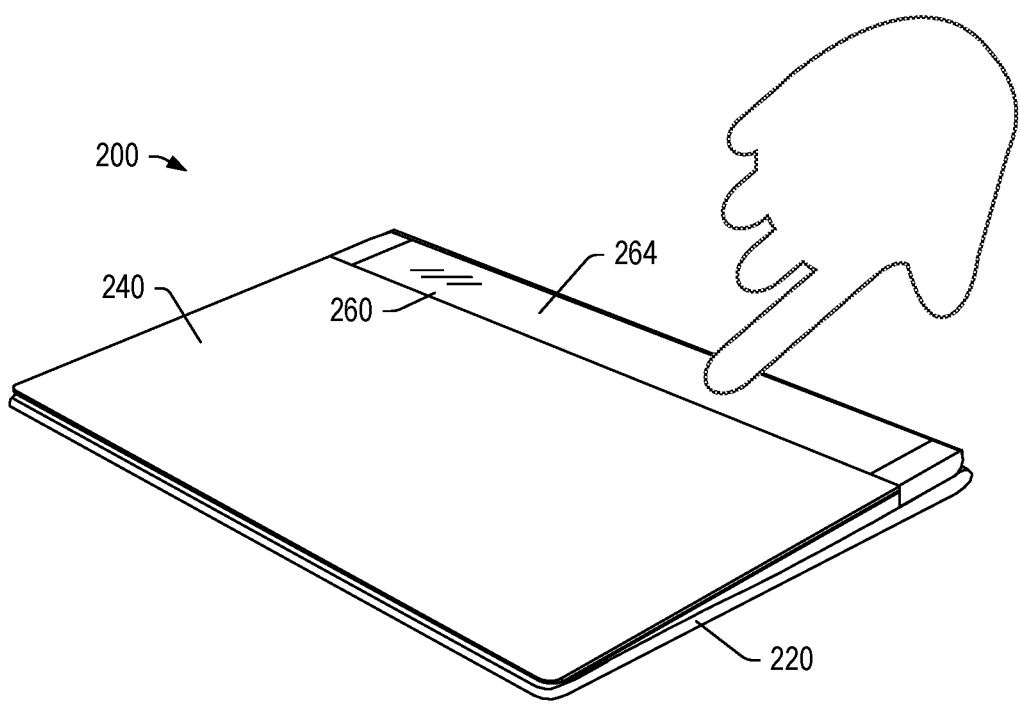
FIG. 6 is a diagram of the example device of FIG. 2 and examples of information rendered to a display thereof.
Figure 6:
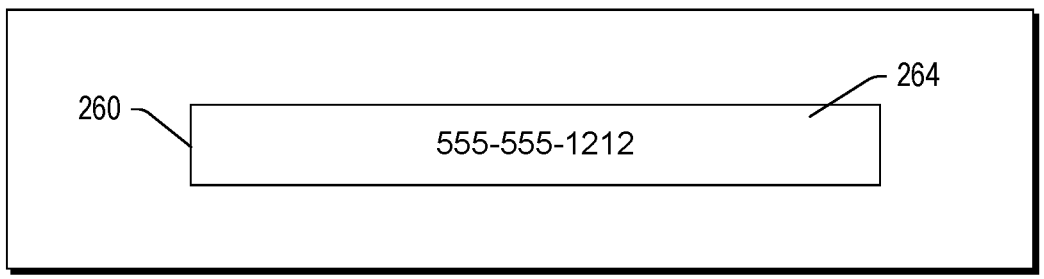
Figure 6:
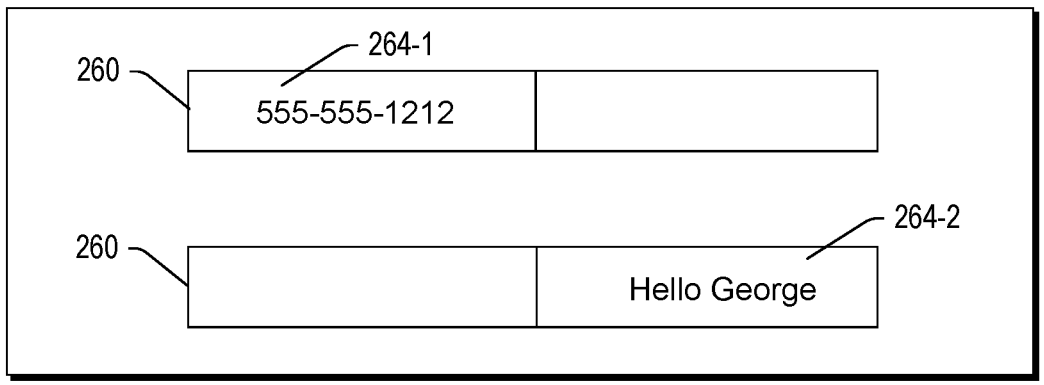

FIG. 6 shows the device 200 of FIG. 2 in a closed state where the mini-display 264 of the mini-display unit 260 is visible. As shown, the mini-display 260 can be segmented. For example, the mini-display 264 can be utilized in full or in part. As an example, the extent of the mini-display 264 that is utilized can depend on orientation of the mini-display 264. For example, when the device 200 is in the closed state, the mini-display 264 can be operated in a segmented mode where one or more segments may be operational for rendering information. In such an example, the mini-display 264 can include two or more segments 264-1 and 264-2 where at least one of the segments is operational. In such an example, a portion of the mini-display 264 may be powered down or in a low power state that may help to conserve battery power.

As an example, one segment of a mini-display may be associated with one type of application while another segment may be associated with another type of application. For example, one segment may be assigned to phone calls and another segment assigned to text messages. In such an example, the mini-display may be able to render phone call associated information and text message associated information simultaneously. As an example, a user may be on a phone call with the phone against his head while a mini-display renders information associated with text messages received via the phone. In such an example, the user may view a text message without moving the phone away from his head. Further, a segment of the mini-display may render information such as one or more of the phone number of the caller, name of the caller, entity of the caller (e.g., employer, etc.), length of time of the call, current time, cost of the call, etc.

As an example, the device 200 can include an exterior ambient light sensor, which may be utilized to adjust brightness of the mini-display unit 260. For example, when it is bright outside, and the device 200 is closed, brightness may be increased to a level that is sufficient to overcome the ambient light and, for example, when it is not bright outside (e.g., in a dark room, on a street at night, in a car at night, etc.), and the device 200 is closed, the brightness may be adjusted to be just sufficient to be visible. When the device 200 is open, one or more sensors (e.g., where at least one is included) may be utilized to adjust brightness, if desired or configured to do so.

As an example, the mini-display unit 260 can be a touch sensitive where it can respond to touch by a user's finger or fingers. As an example, such a touch sensitive mini-display may respond to a stylus, optionally a button push of a stylus, etc. As an example, a touch may correspond to a segment such that only a segment becomes illuminated when touched.

Figure 7:
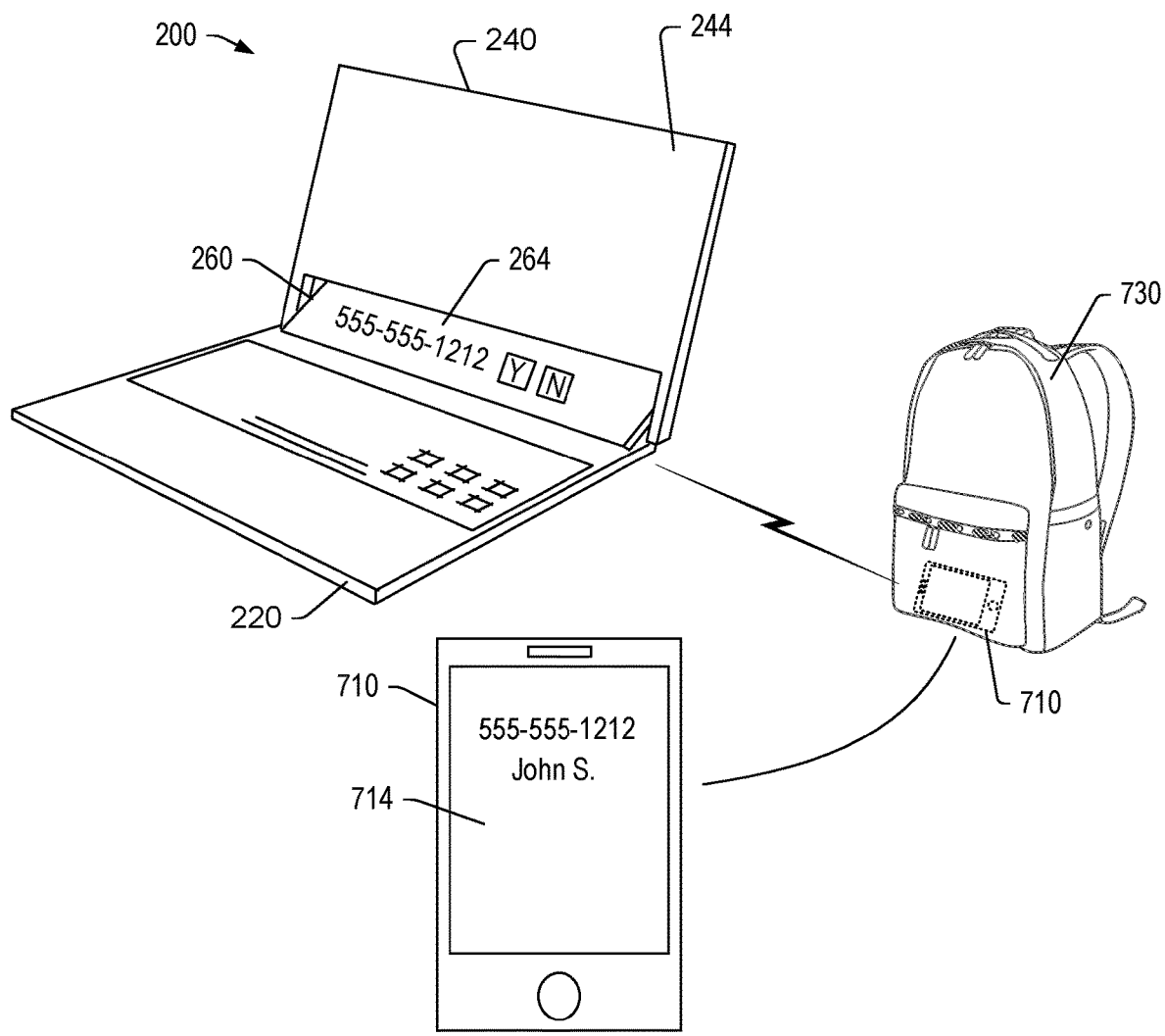
FIG. 7 is a diagram of the example device of FIG. 2 in communication with an example of another device.

FIG. 7 shows the example device 200 of FIG. 2 as being in communication with another device 710, which may be, for example, a smartphone with a display 714. As shown, the device 710 may be in a backpack 730 (e.g., a bag, a purse, etc.) and wirelessly in communication with the device 200 such that a notification generated by the device 710 is communicated to the device 200 and rendered to the mini-display 264. For example, consider rendering of a phone number of a call received by the device 610. In such an example, where the mini-display 264 is a touchscreen display, one or more graphic controls may be rendered to allow a user to touch the mini-display 264 to instruct the device 200 to interact with the device 710. For example, consider a "Y" graphic for answering the phone call and a "N" graphic for not answering the phone call (e.g., dismissing the call). As an example, where the user touches the "Y" graphic, the phone call may occur via a speaker and microphone of the device 200 (e.g., or a headset, etc.).

Figure 8:
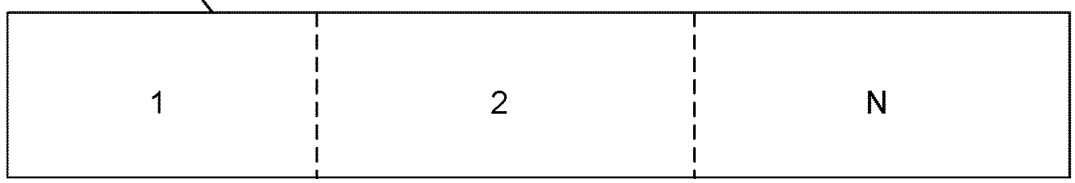
FIG. 8 is a series of views of an example of a display and examples of graphical user interfaces renderable to the display.
Figure 9:
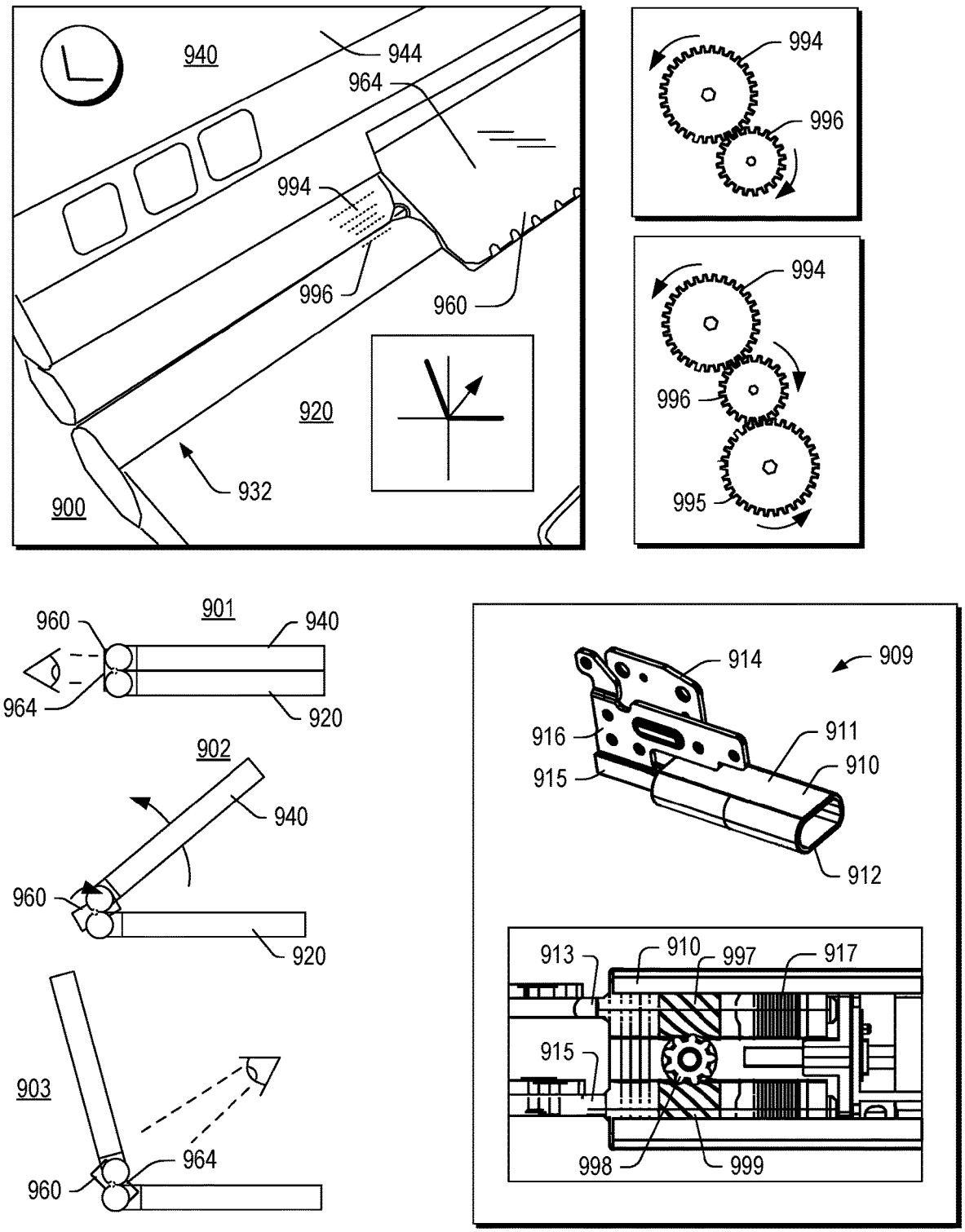
FIG. 9 is a series of views of an example of a device, examples of orientations of the device, an example of a hinge assembly, and examples of mechanisms.

FIG. 8 shows an example of a mini-display unit 860 that includes panels 1, 2 to N, which may be user defined or, for example, defined via one or more display assemblies (see, e.g., FIG. 2). FIG. 9 also shows example GUIs 801, 802, 803, 804 and 805, which may optionally be assigned to one or more panels of the mini-display unit 860. The GUI 801 shows information such as weather and/or traffic information, which may be from a service (e.g., an Internet service, a cellular service, etc.). The GUI 802 shows information associated with email. The GUI 803 shows information associated with a connection, power and time, which may be that of a device or a device that is in communication with the mini-display unit 860. The GUI 804 shows messaging information. The GUI 805 shows a keypad graphic with keys that may be utilized, for example, for numeric entry to perform one or more operations (e.g., dial a phone number, operate a calculator, etc.).

FIG. 9 shows an example of a multiple display device 900 where a mini-display unit 960 includes a display 964. As shown, the multiple display device 900 includes a keyboard housing 920 and a display housing 940 and a hinge assembly 932 that operatively couples the keyboard housing 920 and the display housing 940.

In the example of FIG. 9, the mini-display unit 960 can include an axis and a gear 996 or other type of mechanism that can cause the mini-display unit 960 to rotate about the axis. For example, consider a gear 994 associated with the display housing 940 and the gear 996 as associated with the mini-display unit 960 and/or consider a friction wheel that may ride against a moving component such that the friction wheel rotations when the moving component rotates (e.g., responsive to rotation of the moving component). In the example of FIG. 9, as the display housing 940 transitions from a closed orientation 901 to an open orientation 902 and 903, the movement of the display housing 940 as coupled to the hinge assembly 932 can cause the mini-display unit 960 to rotate.

As shown in FIG. 9, the gear 994 and the gear 996 may be defined at least in part by a gear ratio. As shown in the orientations 901, 902 and 903, the mini-display unit 960 may rotate by about 135 degrees (e.g., or more or less) while the display housing 940 rotates by about 110 degrees. In such an example, the mini-display unit 960 rotates by a greater number of degrees than the display housing 940. In such an example, the gear 994 associated with the display housing 940 can be larger in diameter (e.g., radius) than the gear 996 associated with the mini-display 960. In such an example, the gear 994 can have more teeth than the gear 996. As mentioned, friction wheels may be utilized to achieve a desired ratio of rotation of the mini-display unit 960 with respect to the display housing 940.

As a general rule, when dealing with two gears, if the drive gear is bigger than the driven gear, the latter will turn more quickly, and vice versa. This mechanism can be defined by a gear ratio such as T2/T1, where T1 is the number of teeth on the first gear and T2 is the number of teeth on the second. In the example of FIG. 9, the gear 994 includes 30 teeth while the gear 996 includes 20 teeth. Thus, if the gear 994 rotates about 100 degrees, then the gear 996 will rotate about 150 degrees. In such an arrangement, the gear ratio may be expressed as 30/20, which equals 1.5. Referring again to the example illustrated via the orientations 901, 902 and 903, a gear ratio may be approximately 1.3.

As an example, a multiple display device can include a mechanism that has a ratio of approximately 1.6 or less. As an example, a multiple display device can include a mechanism that has a ratio of approximately 1.5 or less. As an example, a multiple display device can include a mechanism that has a ratio of approximately 1.4 or less. Such a mechanism may be, for example, a geared mechanism or a friction wheel mechanism. Such a mechanism can rotate a mini-display unit a greater angle than a display housing when the display housing is transitioned a number of degrees (e.g., an angle) from a closed orientation with respect to a keyboard housing to an open orientation.

In the example of FIG. 9, the gear 994 may be fixed to the display housing 940 and/or a portion of the hinge assembly 932 and the gear 996 may be fixed to the mini-display unit 960 and may define an axis of the mini-display unit 960.

FIG. 9 also shows an example mechanism that includes the gear 994, the gear 996 and an additional gear 995. In such an example, the gear 994 can be fixed to the display housing 940, the gear 996 can be fixed to the mini-display unit 996 and the gear 995 can be coupled to the keyboard housing 920 and free (e.g., unhindered as to its rotation). In such an example, the gear 995 can include an axle or be supported by an axle that is operatively coupled to the keyboard housing 920. The gear 996 may be supported by the gears 994 and 995, which may, in turn, support the mini-display unit 960. As an example, a coupling may couple an axle of the gear 996 and an axle of the gear 995, for example, to maintain a distance between the two axles and/or to provide support to one of the axles (e.g., or both of the axles).

As an example, the gear 996 may be considered to be an idler gear. An idler gear may be inserted between two or more other gears and may change the direction of rotation of a drive gear. While gears are mentioned, one or more friction wheels may be utilized. For example, an arrangement of friction wheels of sizes of the gears 994, 995 and 996 may be utilized as a mechanism or as part of a mechanism (e.g., a friction drive mechanism). As an example, a mechanism can include one or more belts (e.g., tension belts) that operatively couple wheels (e.g., a belt drive mechanism) where wheels may be selected to provide appropriate ratio or ratios. As an example, a mechanism can include one or more chains that operatively couple wheels (e.g., a chain drive mechanism) where wheels may be selected to provide appropriate ratio or ratios.

The mini-display unit 960 may be coupled to circuitry of the device 900 via one or more wires, contacts, etc. As mentioned, the mini-display unit 960 may include wireless communication circuitry (e.g., WiFi circuitry, BLUETOOTH circuitry, cellular circuitry, etc.). As an example, a mini-display unit may include a SIM card (e.g., disposed in a SIM card slot) such that the mini-display unit can connect to a cellular network (e.g., and optionally the Internet).

As an example, the mini-display unit 960 can include one mechanism or multiple mechanisms (e.g., consider gears on another side or gears on one side and friction wheels or guides on the other side). Where a device includes gears on one side, meshing of the gears can determine the angular rotation of a mini-display unit, which may be stabilized and/or guided by a mechanism on another side that may allow the gear mechanism to dominate (e.g., dictate the position of the mini-display unit). As an example, the mini-display unit 960 can include an axle or axles. For example, the gear 996 may be fixed to an axle that is a drive axle for the mini-display unit 960 and that defines an axis of rotation for the mini-display unit 960. As an example, the hinge assembly 932 can include a recess that can receive the gear 996 and the gear 994 such that the gears 996 and 994 are covered and less likely to trap material. As an example, the hinge assembly 932 can include a recess that can receive a friction wheel or friction wheels. As an example, the device 900 can optionally include one or more covers that can at least partially cover one or more mechanisms for rotating a mini-display unit responsive to transitioning a display housing with respect to a keyboard housing.

FIG. 9 also shows an example of a hinge assembly 909. As shown in FIG. 9, the hinge assembly 909 includes a housing 910 with opposing sides 911 and 912, axles 913 and 915 with corresponding axes, saddles 914 (coupled to the axle 913) and 916 (coupled to the axle 915), gears 997, 998 and 999 and a tensioning mechanism 917 (e.g., a stack of coned washers, etc.). In the hinge assembly 909, the gear 998 is an intermediate gear that is disposed between the gears 997 and 999. As shown, the intermediate gear 998 has a rotational axis that is orthogonal to the rotational axes of the gears 997 and 999. In such an example, the intermediate gear 998 can allow for spacing of axles 913 and 915.

In the example of FIG. 9, the saddles 914 and 916 can be operatively coupled to respective housings of a device such that the housings can be oriented from an approximately 0 degree closed orientation (e.g., a closed clamshell) to an approximately 360 degree open orientation (e.g., a tablet orientation). In such an example, the housing 910 may rotate approximately 180 degrees, for example, from a frontward facing orientation associated with the closed orientation (e.g., a closed clamshell) to a rearward facing orientation associated with the open orientation (e.g., a tablet orientation). The hinge assembly 909 may be utilized in the device 200 of FIG. 2 and/or the device 900 of FIG. 9 where, for example, the saddles 914 and 916 of the hinge assembly 909 can be operatively coupled to the housings 220 and 240 and 920 and 940.

As shown the hinge assembly 909 may be configured with respect to a device such that both axles 913 and 915 rotate. In such an example, the device can include a rotatable a mini-display unit that is operatively coupled to a mechanism that can depend on rotation of one of the two axles 913 and 915 for rotation.

As an example, the saddle 914 can be coupled to the display housing 940 and the saddle 916 can be coupled to the keyboard housing 920. In such an example, the gear 994 may be fixed to the axle 913 such that it rotates with the axle 913. In such an example, the gear 996 can mesh with the gear 994 and be an idler gear that rotates in an opposite direction of the gear 994. In such an example, the gear 995 may be coupled to the axle 915 yet rotate freely therefrom.

As an example, the saddle 914 can be coupled to the display housing 940 and the saddle 916 can be coupled to the keyboard housing 920. In such an example, the gear 995 may be fixed to the axle 915 such that it rotates with the axle 915. In such an example, the gear 996 can mesh with the gear 995 and be an idler gear that rotates in an opposite direction of the gear 995. In such an example, the gear 994 may be coupled to the axle 913 yet rotate freely therefrom. In such an example, the mini-display unit may rotate from the orientation 901 to the orientation 903 in an opposite rotational direction from that shown (e.g., rather than clockwise, it may rotate counter-clockwise). In such an arrangement, a ratio of a mechanism may be greater than approximately 1.5. For example, where the angle formed between the housings 920 and 940 is approximately 105 degrees, the mini-display unit may rotate over 180 degrees (e.g., approximately 225 degrees). As an example, a ratio may be greater than approximately 2.

As an example, a device can be an apparatus that includes a processor; memory accessible by the processor; a first housing that includes a first display operatively coupled to the processor; a second display operatively coupled to the processor and operatively coupled to a mechanism that rotates the second display with respect to the first display; a second housing that includes a keyboard; and a hinge assembly that operatively couples the first housing to the second housing. For example, the device 900 can include a processor; memory accessibly by the processor; the display housing 940 that includes the display 944 as a first display; the mini-display 964 of the mini-display unit 960 as a second display where the mini-display 964 may be operatively coupled to the processor and operatively coupled to a mechanism that rotates the mini-display 964 with respect to the display 944; the keyboard housing 920 that can include a keyboard; and a hinge assembly, which may be a hinge assembly such as the hinge assembly 909 or another type of hinge assembly. In such an example, the mechanism can include one or more wheels that rotate where one of the wheels causes rotation of the mini-display unit 960 and hence the mini-display 964. As shown in the example of FIG. 9, the mini-display 964 may rotate from an outwardly facing orientation when the display housing 940 and keyboard housing 920 are in a closed orientation to an inwardly facing orientation when the display housing 940 and the keyboard housing 920 are in an open orientation (see, e.g., the orientation 903).

In the examples of FIG. 2 and FIG. 9, the device 200 and/or the device 900 can include display circuitry that may be dedicated to a single display or that may be operable for multiple displays. As an example, the mini-display unit 260 and/or the mini-display unit 960 may include display circuitry that can receive information and render information to the mini-display 264 or the mini-display 964 based at least in part on the received information. As an example, the mini-display unit 260 and/or the mini-display unit 960 may be electrically connected to circuitry of the keyboard housing 220 or the keyboard housing 920 and/or circuitry of the display housing 240 or the display housing 940. As an example, the device 200 and/or the device 900 can include wireless communication circuitry, which may allow, for example, receipt of information and rendering of information to one or more of the displays. As an example, the mini-display 264 and/or the mini-display 964 may be operable independent of the display 244 or the display 944.

As an example, a second display, which may be a mini-display, or a device can be operatively coupled to wireless communication circuitry. For example, the second display can be operatively coupled to wireless communication circuitry to render information transmitted via a cellular phone to the wireless communication circuitry of the second display. In such an example, a mini-display can render information generated and/or received by a cellular phone.

As an example, a second display, which can be a mini-display of a clamshell device, may be operable in a low power state where a first display of the clamshell device is powered off. For example, consider a laptop computer with a keyboard housing with a mini-display and a display housing with the main display where in a scenario where the main display is powered off, the mini-display may be in a low power state such that information received by the laptop computer may be rendered to the mini-display. As an example, a second display may be operable to render information communicated to a device via a network interface, optionally when the device is in a low power state (e.g., a sleep state, a hibernate state, etc.). As an example, a device can include one or more network interfaces, which may be or include one or more short-range wireless network interfaces. As an example, a device can include a cellular network interface, a satellite network interface, a WiFi network interface, a BLUETOOTH network interface (e.g., a piconetwork interface), etc.

As an example, an apparatus can include a processor; memory accessible by the processor; a first housing that includes a first display operatively coupled to the processor; a second display operatively coupled to the processor and operatively coupled to a mechanism that rotates the second display with respect to the first display; a second housing that includes a keyboard; and a hinge assembly that operatively couples the first housing to the second housing. In such an example, a display area of the first display can be greater than a display area of the second display. In such an example, the mechanism can rotate the second display about an axis. In such an example, the mechanism may rotate the second display about the axis to a maximum angle with respect to the first display that is greater than approximately 90 degrees with respect to the second housing.

As an example, a mechanism can include axles that define an axis of rotation of a second display, which may be a mini-display of a mini-display unit.

As an example, a mechanism can include a biasing element that applies a biasing force to a second display that rotates the second display. In such an example, the biasing element can include a torsion spring. As an example, a mechanism can include one or more wheels, which may be, for example, belted wheels, chained wheels, geared wheels, friction wheels, etc. Such a mechanism may be defined in part by a ratio where the ratio is greater than approximately 1. For example, where a display housing and a keyboard housing are transitioned from a closed orientation to an open orientation defined by an angle, during transition, a second display (e.g., a mini-display) may rotate a greater amount (e.g., a greater angle). In such an example, the ratio, which may be a gear ratio or other type of ratio, is greater than unity (e.g., greater than approximately 1).

As an example, a second display (e.g., a mini-display) can include a co-planar orientation with respect to a first display and a plurality of non-co-planar, rotated orientations with respect to the first display.

As an example, a second display (e.g., a mini-display) can include a co-planar orientation with respect to a first display where a display surface of the first display and a display surface of the second display face opposite directions.

As an example, a second display (e.g., a mini-display), can include an approximately orthogonal orientation with respect to a first display of a display housing where a display surface of the first display faces a keyboard of a keyboard housing and where the second display faces outwardly from a hinge assembly end of a hinge assembly that operatively couples the display housing and the keyboard housing. In such an example, a user may view the second display when the display housing and the keyboard housing are in a closed orientation. Upon transitioning to an open orientation, the second display can move via a mechanism (or mechanisms) that cause it to rotate and, for example, face inwardly (e.g., viewable when a user is viewing the first display and the keyboard).

As an example, in a closed orientation, a first display can face a keyboard of a keyboard housing and a second display can face away from the keyboard, which can be directly away. For example, if the keyboard is facing upward with respect to gravity and the first display is facing downward with respect to gravity, in the closed orientation, the second display can be facing upward with respect to gravity as well, which is away from the keyboard.

As an example, a device can include an open orientation where a first display forms a first angle with respect to a keyboard and where a second display forms a second, different angle with respect to the keyboard. In such an example, the second, different angle can be greater than the first angle where, for example, the angle may be defined with respect to the keyboard being horizontal (e.g., approximately zero degrees). As an example, angles can be taken to be absolute values. For example, a display housing that is opened −105 degrees with respect to a keyboard housing (e.g., rotated counter-clockwise therefrom), may be considered to be open at an angle of 105 degrees.

As an example, a device can include a second display that includes an edge that forms a contact with a second housing, which can be a keyboard housing. In such an example, the contact can determine an angle of the second display with respect to the second housing.

As an example, a mechanism can include a biasing element that applies force to a second display where the second display applies at least a portion of the force to a second housing, which may be a keyboard housing.

As an example, a first housing can include an opening where, in a closed orientation of the first housing and a second housing, a second display is disposed in the opening.

As an example, a method can include for an apparatus that includes a first housing that includes a first display, a second display operatively coupled to a mechanism that rotates the second display with respect to the first display, a second housing that includes a keyboard, and a hinge assembly that operatively couples the first housing to the second housing, in a rotated, non-co-planar orientation of the first display and the second display, applying force to the second housing via the second display. In such an example, in a co-planar orientation of the first display and the second display, the method can include applying force to the second housing via the second display. In such an example, a mechanism can include a biasing element that biases the second display against the second housing.

As an example, a method can include, for an apparatus that includes a first housing that includes a first display, a second display operatively coupled to a mechanism that rotates the second display with respect to the first display, a second housing that includes a keyboard, and a hinge assembly that operatively couples the first housing to the second housing, transitioning the first housing and the second housing from a closed orientation where the first display faces the keyboard to an open orientation that forms an angle between the first housing and the second housing and, responsive to the transitioning, rotating the second display from a first viewable orientation associated with the closed orientation of the first housing and the second housing to a second viewable orientation associated with the open orientation that form the angle between the first housing and the second housing. In such an example, the first viewable orientation of the second display can be outwardly facing from the apparatus, for example, viewable from a back side of the first housing where the back side is opposite the display side of the first housing or, for example, viewable from a hinge side of the apparatus.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that include at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
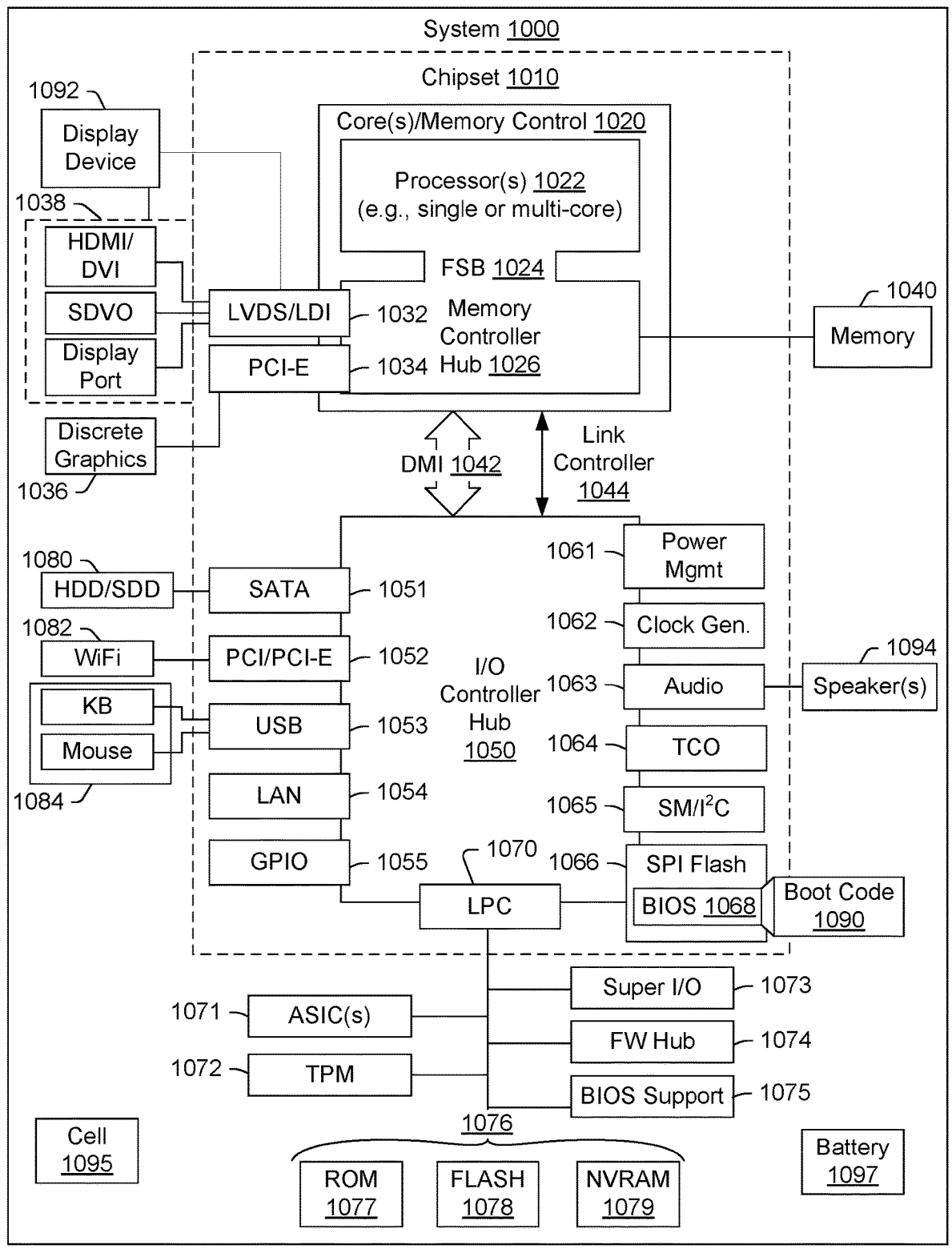
FIG. 10 is a diagram of an example of a system that includes one or more processors.

While various examples of circuits or circuitry have been discussed, FIG. 10 depicts a block diagram of an illustrative computer system 1000. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1000. As an example, the device 200 of FIG. 2, the device 900 of FIG. 9, etc. can include one or more features of the system 1000 of FIG. 10.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
    a processor;
    memory accessible by the processor;
    a first housing that comprises a through opening and a first display operatively coupled to the processor;
    a display unit that comprises a second display operatively coupled to the processor wherein the display unit is operatively coupled to a mechanism that rotates the display unit with respect to the through opening of the first housing;
    a second housing that comprises a keyboard;
    a hinge assembly that operatively couples the first housing to the second housing;
    a co-planar orientation of the display unit and the first housing, wherein the first display faces the keyboard and is not viewable and wherein the second display faces away from the keyboard and is viewable; and
    a non-co-planar orientation of the display unit and the first housing wherein the display unit is rotated in the through opening.

2. The apparatus of claim 1 wherein a display area of the first display is greater than a display area of the second display.

3. The apparatus of claim 1 wherein the mechanism rotates the second display about an axis.

4. The apparatus of claim 3 wherein the mechanism rotates the second display about the axis to a maximum angle with respect to the first display that is greater than approximately 90 degrees with respect to the second housing.

5. The apparatus of claim 3 wherein the mechanism comprises axles that define the axis.

6. The apparatus of claim 1 wherein the mechanism comprises a biasing element that applies a biasing force to the second display that rotates the second display.

7. The apparatus of claim 6 wherein the biasing element comprises a torsion spring.

8. The apparatus of claim 1 comprising an open orientation wherein the first display forms a first angle with respect to the keyboard and wherein the second display forms a second, different angle with respect to the keyboard.

9. The apparatus of claim 8 wherein the second, different angle is greater than the first angle.

10. The apparatus of claim 1 wherein the display unit comprises an edge that forms a contact with the second housing.

11. The apparatus of claim 10 wherein the contact determines an angle of the second display with respect to the second housing.

12. The apparatus of claim 1 wherein the mechanism comprises a biasing element that applies force to the display unit and wherein the display unit applies at least a portion of the force to the second housing.

13. A method comprising:
    for an apparatus that comprises a first housing that comprises a through opening and a first display, a display unit that comprises a second display wherein the display unit is operatively coupled to a mechanism that rotates the display unit with respect to the through opening of the first housing, a second housing that comprises a keyboard, and a hinge assembly that operatively couples the first housing to the second housing,
    transitioning the first housing and the second housing from a closed orientation wherein the first display faces the keyboard to an open orientation that forms an angle between the first housing and the second housing and, responsive to the transitioning, rotating the display unit from an unrotated orientation in the through opening associated with the closed orientation of the first housing and the second housing to a rotated orientation in the through opening associated with the open orientation that forms the angle between the first housing and the second housing.

14. The apparatus of claim 1 wherein the mechanism that rotates the display unit with respect to the through opening of the first housing rotates the display unit automatically in response to rotation via the hinge assembly of the first housing with respect to the second housing.

15. The apparatus of claim 1 wherein the through opening is adjacent to the hinge assembly.

16. The apparatus of claim 1 wherein the through opening comprises an area that is less than an area of the first display.

17. The apparatus of claim 1 wherein the first housing comprises an area defined at least in part by an area of the through opening and an area of the first display.

* * * * *